US011981090B2

(12) United States Patent
Ferriell et al.

(10) Patent No.: US 11,981,090 B2
(45) Date of Patent: May 14, 2024

(54) METHOD OF FORMING A REINFORCED PANEL COMPONENT

(71) Applicant: The Boeing Company, Chicago, IL (US)

(72) Inventors: Daniel Richard Ferriell, St. Louis, MO (US); Timothy J. Luchini, St. Louis, MO (US); Marcus Anthony Belcher, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 224 days.

(21) Appl. No.: 16/517,264

(22) Filed: Jul. 19, 2019

(65) Prior Publication Data
US 2021/0016521 A1  Jan. 21, 2021

(51) Int. Cl.
*B29C 70/34* (2006.01)
*B29D 99/00* (2010.01)
*B29L 31/30* (2006.01)
*B64C 1/00* (2006.01)
*B64C 1/06* (2006.01)

(52) U.S. Cl.
CPC ............ *B29C 70/34* (2013.01); *B29D 99/001* (2013.01); *B29L 2031/3076* (2013.01); *B64C 2001/0072* (2013.01); *B64C 1/064* (2013.01)

(58) Field of Classification Search
None
See application file for complete search history.

(56) References Cited

U.S. PATENT DOCUMENTS 3,373,067 A  3/1968  Hagstrom
5,869,814 A  2/1999  Scoles
(Continued)

FOREIGN PATENT DOCUMENTS

GB  2492808 A  * 1/2013  ........... B29C 43/003
GB  2502654 A  * 12/2013  ............. B29C 43/00
WO  WO 2019/031111     2/2019

OTHER PUBLICATIONS

Extended European Search Report from corresponding European Application No. 20177358.7, dated Nov. 20, 2020.
(Continued)

*Primary Examiner* — Barbara J Musser
(74) *Attorney, Agent, or Firm* — Quinn IP Law

(57) ABSTRACT

A method of forming a reinforced panel may include engaging a reinforcement component having a faying surface with a first portion of a heated press, engaging an uncured panel component with an opposing second portion of the press, the panel component having a faying surface complementarily-configured with respect to the faying surface of the reinforcement component, treating the faying surface of the reinforcement component such that the faying surface is active for co-bonding with respect to the panel component, actuating the press to direct the first and second portions of the press toward each other, such that the faying surfaces are complementarily engaged under pressure; and heating the first and second portions of the press to a curing temperature associated with the panel component to substantially simultaneously co-bond the faying surfaces of the reinforcement component and the panel component together, cure the panel component, and form the reinforced panel.

18 Claims, 4 Drawing Sheets

(56) References Cited

U.S. PATENT DOCUMENTS

| | | | |
|---|---|---|---|
| 6,431,850 B1* | 8/2002 | Evans | B29C 70/549 |
| | | | 425/470 |
| 7,861,969 B2 | 1/2011 | Guzman et al. | |
| 8,057,623 B2* | 11/2011 | Kallinen | B29C 70/545 |
| | | | 156/221 |
| 11,148,408 B2 | 10/2021 | Belcher | |
| 2008/0302915 A1* | 12/2008 | Yip | B29C 70/342 |
| | | | 244/132 |
| 2010/0124659 A1 | 5/2010 | Nelson et al. | |
| 2013/0048601 A1 | 2/2013 | Dryer et al. | |
| 2014/0099477 A1 | 4/2014 | Matsen et al. | |
| 2015/0298388 A1* | 10/2015 | Wong | B29C 70/026 |
| | | | 428/413 |
| 2016/0082650 A1* | 3/2016 | Carson, Jr. | B29C 66/712 |
| | | | 156/184 |
| 2018/0370163 A1* | 12/2018 | Belisle | B29D 99/0003 |

OTHER PUBLICATIONS

CompositesWorld: "Consolidating thermoplastic composite aerostructures in place, Part 1," Jan. 29, 2018, Retrieved from the Internet: https://www.compositesworld.com/articles/consolidating-thermoplastic-composite-aerostructures-in-place-part-1 [Retrieved on Jul. 19, 2019].

CompositesWorld: "Out of autoclave prepregs: Hype or revolution?" Jan. 1, 2011, Retrieved from the Internet: https://www.compositesworld.com/articles/out-of-autoclave-prepregs-hype-or-revolution [Retrieved on Jul. 19, 2019].

European Office Action dated Nov. 22, 2022, in corresponding European application No. 20177358.7.

* cited by examiner

METHOD OF FORMING A REINFORCED PANEL COMPONENT

TECHNOLOGICAL FIELD

The present disclosure relates generally to reinforced panel components for aircraft. More particularly, the present disclosure relates to methods and apparatuses for forming reinforced panel components.

BACKGROUND

Aircraft generally include an airframe, which may be regarded as an underlying structure to which skin panels are attached to form a smooth aerodynamic outer surface. The wings of aircraft also include an underlying structure covered with skin panels. The underlying structure may include stringers, which together with longerons, formers, frames, ribs, spars, etc., form the structural framework. The skin panels are generally light and thin to minimize the weight of the aircraft and increase its payload and range. Since skin panels are thin, they are generally flexible and require stiffening in cooperation with the underlying structure to prevent undesired movement, flexing, and vibration of the skin panels during flight.

Often, stiffening of the skin panel is accomplished by joining stringers to the skin panels. However, joining stringers and skin panels requires multiple processing cycles, which is time-consuming and expensive. Therefore, a need exists for reducing cycle times and costs of joining stringers to skin panels, in instances where the stringers are used to reinforce the skin panels, while also keeping part counts and weight to a minimum.

BRIEF SUMMARY

One example of the present disclosure is directed to a method of forming a reinforced panel component for aircraft or any similar application. As used herein, a "reinforced panel component," "reinforced panel," and "reinforced component," all refer to the same element. In a particular example, a method of forming the reinforced panel component includes the application of heat and pressure to substantially simultaneously (e.g., at the same time or at nominal difference in time) co-bond faying surfaces of a reinforcement component and a panel component together, and cure the panel component, so as to form the reinforced panel component. Substantially simultaneously co-bonding the faying surfaces and curing the panel component advantageously reduces the typical cycle times and costs of joining reinforcement components (e.g., composite stringers) to panel components (e.g., composite skin panels), while also keeping part counts and part weights to a minimum. For example, in one instance, a typical cycle time of about 8-10 hours using an autoclave is reduced to about 20-50 minutes using the apparatus and method disclosed herein.

Accordingly, the present disclosure provides, in one example, a method of forming a reinforced panel, the method comprising: engaging a reinforcement component with a first portion of a heated press, the reinforcement component having a faying surface; engaging an uncured panel component with an opposing second portion of the press, the panel component having a faying surface complementarily-configured with respect to the faying surface of the reinforcement component; treating the faying surface of the reinforcement component such that the faying surface is active for co-bonding with respect to the panel component; actuating the press to direct the first and second portions of the press toward each other, such that the faying surfaces of the reinforcement component and the panel component are complementarily engaged under pressure; and heating the first and second portions of the press to a curing temperature associated with the panel component to substantially simultaneously co-bond the faying surfaces of the reinforcement component and the panel component together, cure the panel component, and form the reinforced panel.

The present disclosure also provides, in another example, a method of forming a reinforced component, the method comprising: positioning a first component formed of a consolidated material on a first side of a heated press, the consolidated material having a faying surface; positioning a second component formed of a non-consolidated material on an opposing second side of the heated press, the non-consolidated material having a faying surface complementarily-configured with respect to the faying surface of the consolidated material; treating the faying surface of the consolidated material such that the faying surface is active for co-bonding with respect to the non-consolidated material; actuating the press to direct the first and second sides of the press toward each other, such that the faying surfaces of the consolidated material and the non-consolidated material are complementarily engaged under pressure; and heating the first and second sides of the press to a curing temperature associated with the non-consolidated material to substantially simultaneously co-bond the faying surfaces of the consolidated material and the non-consolidated material together, cure the non-consolidated material, and form the reinforced component.

The present disclosure further provides, in another example, an apparatus for forming a reinforced panel, the apparatus comprising: a first planar platen having a planar surface; a second planar platen having a planar surface adapted to engage a panel component, the second planar platen being co-operable with the first planar platen to apply a pressure therebetween; and an intermediate insert adapted to engage a reinforcement component, the intermediate insert having a planar first surface engageable with the planar surface of the first or second planar platen and an opposing second surface engageable with and conformal to the reinforcement component such that the pressure applied to the reinforcement component and the panel component, between the first and second planar platen, is evenly distributed across the reinforcement component, wherein at least the intermediate insert and the first or second planar platen are heated.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure or recited in any one or more of the claims, regardless of whether such features or elements are expressly combined or otherwise recited in a specific embodiment description or claim herein. This disclosure is intended to be read holistically such that any separable features or elements of the disclosure, in any of its aspects and embodiments, should be viewed as intended to be combinable, unless the context of the disclosure clearly dictates otherwise.

BRIEF DESCRIPTION OF THE DRAWING(S)

Having thus described examples of the disclosure in general terms, reference will now be made to the accompanying drawings, which are not necessarily drawn to scale, and wherein:

DETAILED DESCRIPTION

Figure 1:
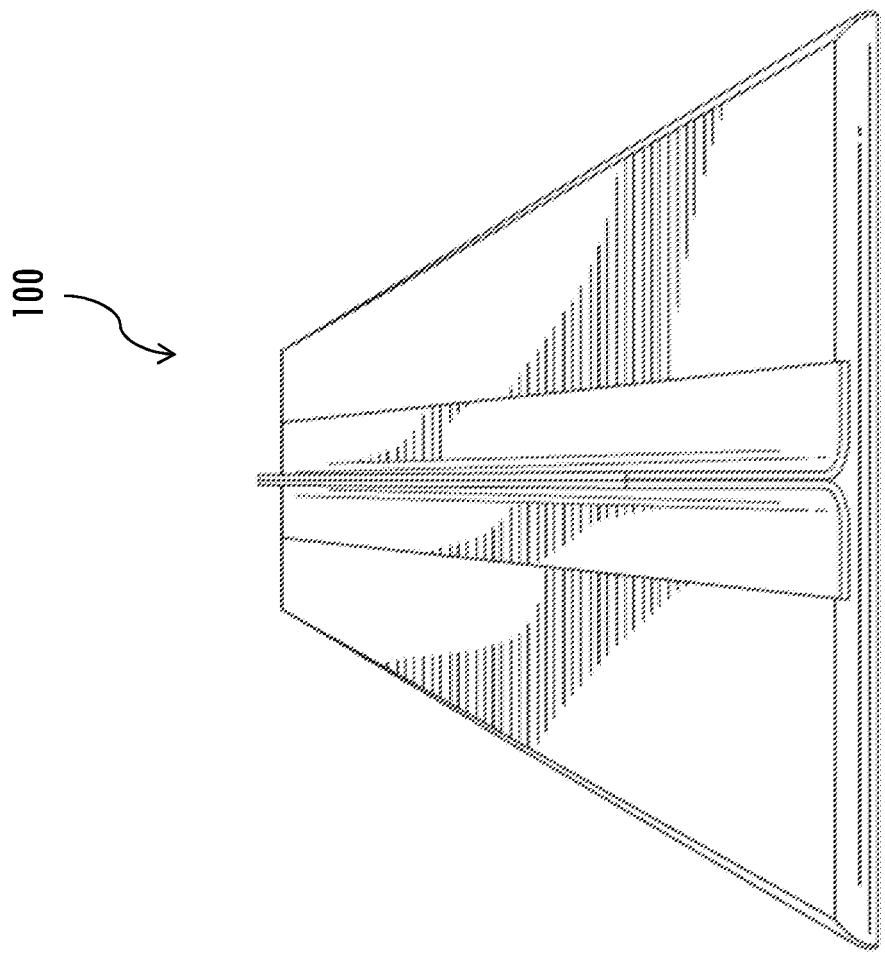
FIG. 1 illustrates a reinforced panel according to some examples of the present disclosure.

Some examples of the present disclosure will now be described more fully hereinafter with reference to the accompanying drawings, in which some, but not all examples of the disclosure are shown. Indeed, various examples of the disclosure may be embodied in many different forms and should not be construed as limited to the examples set forth herein; rather, these examples are provided so that this disclosure will be thorough and complete, and will fully convey the scope of the disclosure to those skilled in the art. For example, unless otherwise indicated, reference to something as being a first, second or the like should not be construed to imply a particular order. Also, something described as being above something else (unless otherwise indicated) may instead be below, and vice versa; and similarly, something described as being to the left of something else may instead be to the right, and vice versa. Like reference numerals refer to like elements throughout.

Examples of the present disclosure are generally directed to a method of forming a reinforced panel component and a related apparatus. As illustrated in FIG. 1, for example, a reinforced panel component 100 is formed from the method and apparatus disclosed herein. The reinforced panel component 100 comprises, in particular aspects, a cross-section having a size/shape dependent upon its application in the aircraft structure. For example, the reinforced panel component 100 comprises a cross-section defining a channel with or without a flange (e.g., a "bell" shape or a "hat" shape), a hook or a "J" shape, or one or more vertical or horizontal components (e.g., a vertical component sandwiched between two horizontal components or an "I" shape, a vertical component having a horizontal component at one end or a "T" shape); although any other shapes, sizes, types, etc., are contemplated by aspects of the present disclosure. As illustrated in FIG. 1, the reinforced panel component is a hat-shaped reinforced panel component formed by substantially simultaneously co-bonding faying surfaces of a reinforcement component and panel component together, and curing the panel component, described in more detail as follows.

As used herein, a reinforcement component, in particular aspects, is considered a composite reinforcement component, such as a composite stiffener, where the composite reinforcement component is formed by molding, stamping, etc., a composite material. The composite material of the reinforcement component is comprised of or includes a resin reinforced with a reinforcing material. Reinforcing materials comprise, but are not limited to, a manmade or natural fiber including carbon fiber, glass fiber, glass spheres, mineral fiber, or other reinforcing materials. If fibers are used as a reinforcing material, for example, the fibers are continuous or chopped, and are unidirectional, randomly-oriented, or in the form of a weave such as, but not limited to, a plain weave, a crowfoot weave, a basket weave, or a twill weave. The resin comprises, for example, thermoplastic materials that include, but are not limited to, polyphenylene sulfide, polyaryletherketone (PAEK), polyetherketoneketone (PEKK), polyetheretherketone (PEEK), polyimide, polyetherimide, polyamide, polyamide-imide, polyester, polybutadiene, polyurethane, polypropylene, polysulfone, polyethersulfone, polyphenylsulfone, polyacrylamide, polyketone, polyphthalamide, polyphenylene ether, polybutylene terephthalate, polyethylene, polyethylene terephthalate, polyester-polyarylate (e.g. VECTRAN®), polytetrafluoroethylene (PTFE), or other thermoplastic resins. Alternatively, the resin comprises, for example, thermoset materials that include, but are not limited to, epoxy resins, cyanate esters, benzoxazines, polyimides, bismaleimides, vinyl esters, polyurethanes, polyureas, polyurethane/polyurea blends, polyesters, or other thermoset resins. Likewise, a panel component, in particular aspects, is considered a composite panel component, such as a composite skin panel, where the composite panel component is formed from one or more composite materials, comprised of or including a resin reinforced with a reinforcing material metal as described in reference to the reinforcement component, a matrix composite with polymer skin, a glass aluminum composite with polymer skin, or a titanium aluminum composite with polymer skin.

In some examples, the reinforcement component is considered a non-consolidated component while the panel component is considered a consolidated panel component. More particularly, substantially simultaneously co-bonding the respective faying surfaces of the reinforcement component and the panel component together, and curing the panel component (e.g., performing the co-bonding and the curing procedures substantially simultaneously), results in consolidation of the reinforcement component and the panel component to form the reinforced panel. A faying surface as used herein is one of two or more surfaces that are in direct or indirect contact with one another and are connected to one another through one or more of bolts, rivets, welding, soldering, bonding, etc.

Accordingly, the method and apparatus disclosed herein advantageously reduces costs and cycle times associated with the formation of a lightweight and rigid reinforced panel component. This is achieved through the utilization of a heated press with two platens co-operable with one another, which enables the reinforcement component and the panel component to be co-bonded with one another at respective faying surfaces while the panel component is cured (e.g., performing the co-bonding and the curing procedures substantially simultaneously). By doing so, the separate cycles of curing the panel component and then joining the reinforcement component and the cured panel component are combined into a single cycle using the heated press.

Figure 2:
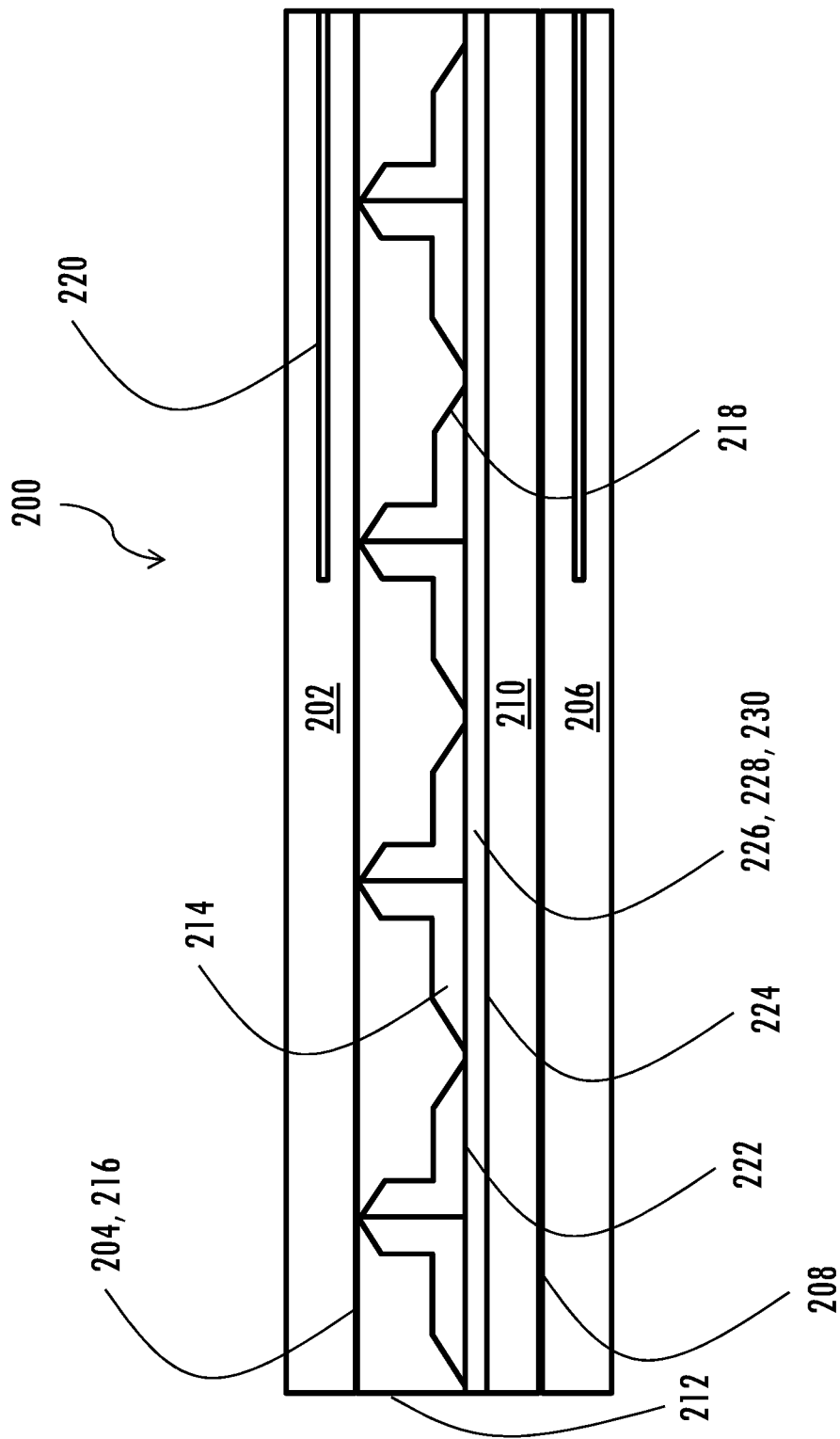
FIG. 2 illustrates an apparatus for forming a reinforced panel according to some examples of the present disclosure.

FIG. 2 illustrates an example of an apparatus in a closed position for forming a reinforced panel, the apparatus generally being designated as reference numeral 200. In some examples, the reinforced panel is the reinforced panel 100 illustrated in FIG. 1, or another type of reinforced panel in some other examples. Indeed, a reinforced panel of any size, shape, material, etc., is formable using the apparatus illustrated in FIG. 2. In some examples, the apparatus 200 comprises a heated press having a first portion and an opposing second portion that are brought into engagement with one another (e.g., the first and second portions of the press moving between an open position and a closed position).

In some examples, the apparatus 200 comprises a first planar platen 202 or first portion having a planar surface 204. A second planar platen 206 or second portion has a planar surface 208 adapted to engage a second component or a panel component 210. The panel component 210 is a composite thermoset skin panel comprised of a fiber (e.g., a carbon fiber, a particle, etc.) and a polymer resin matrix. Other composite materials of the panel component 210 are also contemplated. The thermoset skin is hardened by a curing process induced by heating the thermoset skin to a curing temperature, radiation, etc., and is promoted by high pressure.

More particularly, and in order to initiate curing the thermoset skin, the second planar platen 206 is co-operable with the first planar platen 202 so as to apply a pressure therebetween. For example, the two platens 202, 206 are operably engaged with one another or brought into contact with one another (e.g., by concurrently operating each platen, operating only one platen, or operating each platen at different instances) so that a pressure is applied as a directional normal force on the platens (e.g., the first planar platen 202 exerts a normal force on the second planar platen 206, and the second planar platen 206 exerts an opposing normal force on the first planar platen 202). The pressure is between about 50 to about 150 pounds per square inch (psi), where the amount of normal force exerted, in some instances, is dependent on the surface area of the planar platen.

An intermediate insert or press member 212 is engageable with a reinforcement component 214. In some examples, the reinforcement component 214 is a composite thermoplastic or thermoset composite stiffener. Where the reinforcement component is a composite thermoplastic reinforcement component, the composite thermoplastic reinforcement component softens when heated to a melting temperature associated with the composite thermoplastic material and then hardens when cooled.

The intermediate insert or press member 212 has a planar first surface or press surface 216 engageable with the planar surface 204, 208 of the first or second planar platen 202, 206 and an opposing second surface 218 engageable with and conformal to the reinforcement component 214, such that the intermediate insert or press member 212 is considered complementarily configured with respect to the planar or press surface 204, 208. As illustrated in FIG. 2, the planar first surface 216 of the intermediate insert 212 is engaged with the first planar platen 202, while the second surface 218 is engaged with and conforms to the reinforcement component 214. In particular, the second surface 218 of the intermediate insert 212 has a contour that corresponds to a contour of the reinforcement component 214. For example, the contour of the reinforcement component 214 is based on the shape of the reinforcement component 214, where the reinforcement component 214 has a cross-section that is shaped as a "bell", a "hat", an "I", a "J", or a "T", such that the second surface 218 has a contour that correspondingly receives the reinforcement component so shaped. Contouring the second surface 218 of the intermediate insert 212 advantageously results in that the pressure applied to the reinforcement component 214 and the panel component 210, between the first and second planar platens 202, 206, is evenly distributed across the reinforcement component 214. The apparatus 200 further includes a heating element 220 associated with at least the intermediate insert 212 and the first or second planar platen 202, 206. The heating element 220 is arrangeable to heat at least the intermediate insert 212 and the first or second platen 202, 206 to substantially simultaneously co-bond the reinforcement component 214 and the panel component 210 together, cure the panel component 210, and form a reinforced panel (e.g., 100, FIG. 1).

In some examples, the intermediate insert 212 and the first or second platen 202, 206 is heated through an electrical connection with a power source (not shown) of the apparatus 200, while the intermediate insert 212 and the first or second platen 202, 206 are operably engaged with one another and are under pressure. For example, actuation of the power source directs electrical current to the heating element 220, such as for example a heat rod, embedded in, integrated with, or otherwise associated with the intermediate insert 112 and/or the first or second platen 202, 206. The intermediate insert 112 and the first or second platen 202, 206 are then heated by the heating element 220 to a curing temperature associated with the panel component 210. The curing temperature of the panel component 210 depends on the material of the panel component, where different materials have different curing temperatures. For example, the intermediate insert 212 and the first or second platen 202, 206 is heated to a curing temperature between about 250 degrees Fahrenheit (° F.) and about 500° F. for between about 25 minutes and about 50 minutes, where the panel component is a composite thermoset, so as to substantially simultaneously co-bond respective faying surfaces 222, 224 of the reinforcement component 214 and the panel component 210 together, cure the panel component 210, and form the reinforced panel. The curing temperature associated with the panel component 210 is a temperature that is less than a melting temperature associated with the reinforcement component 214. In this manner, heating the panel component 210 and the reinforcement component 214 does not melt the reinforcement component while the panel component 210 is cured.

In some examples, the reinforcement component 214 is treated prior to the first and second planar platens 202, 206 being operably engaged. More particularly, the faying surface 222 of the reinforcement component 214 and/or the faying surface 224 of the panel component 210 is treated through application of a film, an energetic surface preparation, and the like so that the faying surface 222, 224 is active for co-bonding with respect to the panel component 210. The type of preparation treatment applied to the faying surface(s) 222, 224 depends on the material of the reinforcement component 214.

For example, where the reinforcement component 214 is a composite thermoplastic reinforcement component, a thermoplastic film 226 is applied on the faying surface 222 of the thermoplastic reinforcement component such that the faying surface 222 is active for co-bonding with respect to the panel component 210. The thermoplastic film 226 comprises at least one of a polyetherimide (PEI), a polyphenylene sulfide, a polyimide, a polyamide, a polyamide-imide, a polyester, a polybutadiene, a polyurethane, a polypropylene, a polysulfone, a polyethersulfone, a polyphenylsulfone, a polyacrylamide, a polyketone, a polyphthalamide, a polyphenylene ether, a polybutylene a terephthalate, a polyethylene, a polyethylene terephthalate, a polyester-polyarylate, a polytetrafluoroethylene (PTFE), or any combination thereof.

In another example, where the reinforcement component 214 is a composite thermoset reinforcement component, an adhesive promoter film 228 is applied on the faying surface 222 of the composite thermoset reinforcement component 214 and/or an energetic surface preparation 230 is performed on the faying surface 222 of the composite thermoset reinforcement component 214 such that the faying surface 222 is active for co-bonding with respect to the panel component 210. The adhesive promoter film comprises of unfilled, partially advanced epoxy resin. The energetic surface preparation comprises performing a corona treatment, a plasma treatment, a flame treatment, or the like on the faying surface 222 of the composite thermoset reinforcement component 214 such that the faying surface 222 is active for co-bonding with respect to the panel component 210.

In some examples, a suction mechanism (not shown) is utilized in order to apply suction to the apparatus 200 to remove any air or volatiles trapped in the uncured panel component 210. Removal of air or volatiles ensures a strong co-bond between the reinforcement component 214 and the panel component 210, where any air or volatiles prevent a strong and secure co-bond at the faying surfaces 222, 224.

Accordingly, the apparatus illustrated in FIG. 2, provides for the reinforcement component 214 and the panel component 210 to be co-bonded while the panel component 210 is cured. The time period for doing so is, in some aspects, shorter than conventional joining methods, such that a significant cost savings and efficiency is realized.

Figure 3:
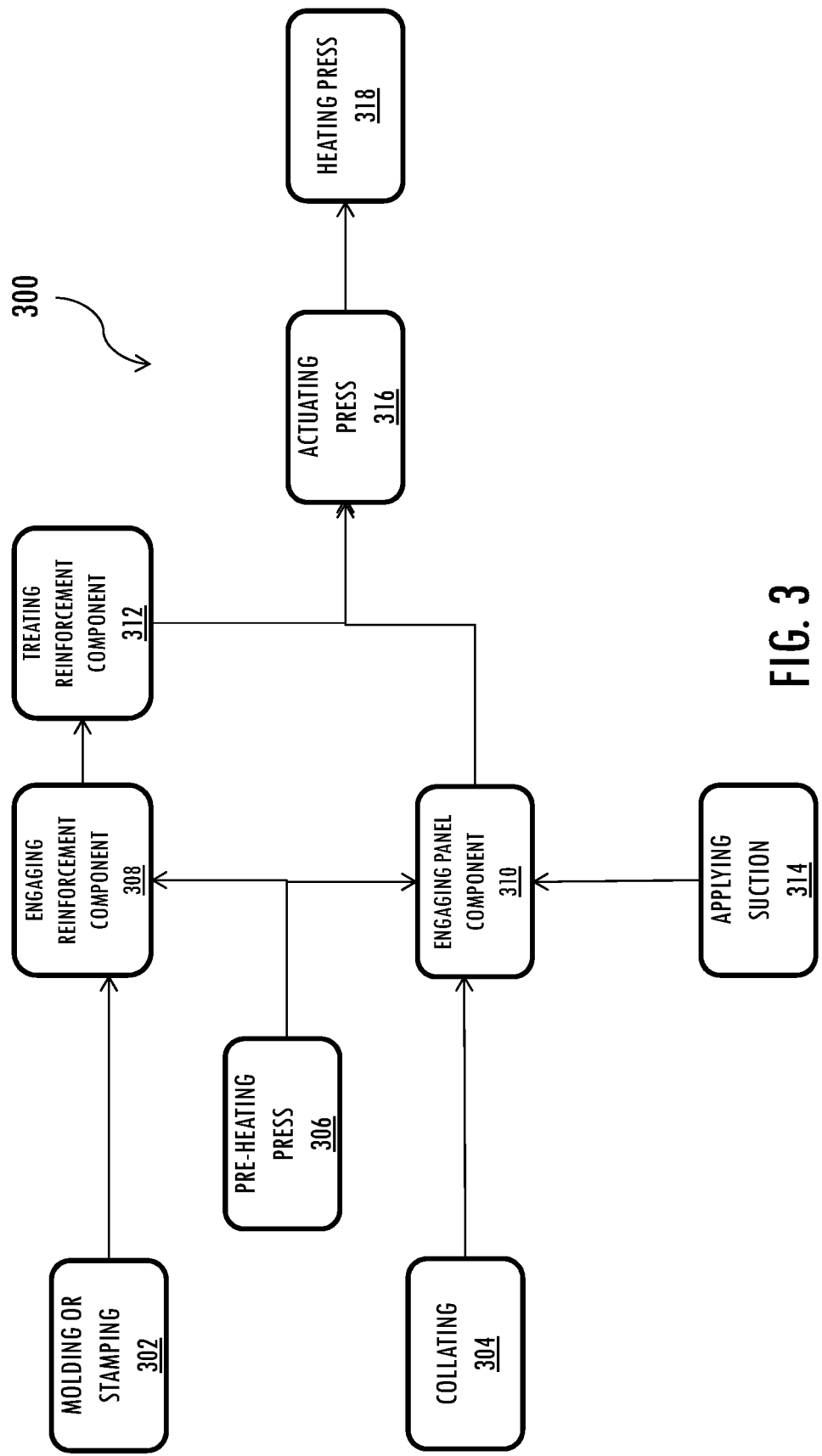
FIG. 3 illustrates a method of forming a reinforced panel according to some examples of the present disclosure.

FIG. 3 illustrates an example of a method of forming a reinforced panel, where the method is generally indicated by the reference numeral 300. In some instances, the reinforced panel is a panel such as that illustrated in FIG. 1. Further, the method 300 is performed using an apparatus, such as the apparatus 200 in FIG. 2.

In step 302, molding (e.g., continuous compression molding (CCM)) or stamping a material is performed to form a reinforcement component (e.g., element 214 in FIG. 2). In step 304, collating uncured plies of a panel component (e.g., element 210 in FIG. 2) is performed. In step 306, the apparatus (e.g., a heated press such as the apparatus 200 in FIG. 2) is pre-heated to a pre-heated temperature, the pre-heated temperature being less than a curing temperature associated with the panel component. For example, the press is pre-heated to between about 225° F. and about 475° F.

In step 308, the reinforcement component is engaged with a first portion (e.g., element 202 in FIG. 2) of the heated press, the reinforcement component having a faying surface. In step 310, the uncured panel component is engaged with an opposing second portion (e.g., element 208 in FIG. 2) of the press, the panel component having a faying surface complementarily-configured with respect to the faying surface of the reinforcement component. In step 312, the faying surface of the reinforcement component is treated such that the faying surface is active for co-bonding. Notably, step 312 is optional and is dependent on the material of the reinforcement component.

In step 314, suction is applied to the press to remove any air or volatiles trapped in the uncured panel component. In step 316, the press is actuated to direct the first and second portions of the press toward each other, such that the faying surfaces of the reinforcement component and the panel component are complementarily engaged under pressure. In step 318, the first and second portions of the press is heated to the curing temperature associated with the panel component to substantially simultaneously co-bond the faying surfaces of the reinforcement component and the panel component together, cure the panel component, and form the reinforced panel.

Figure 4:
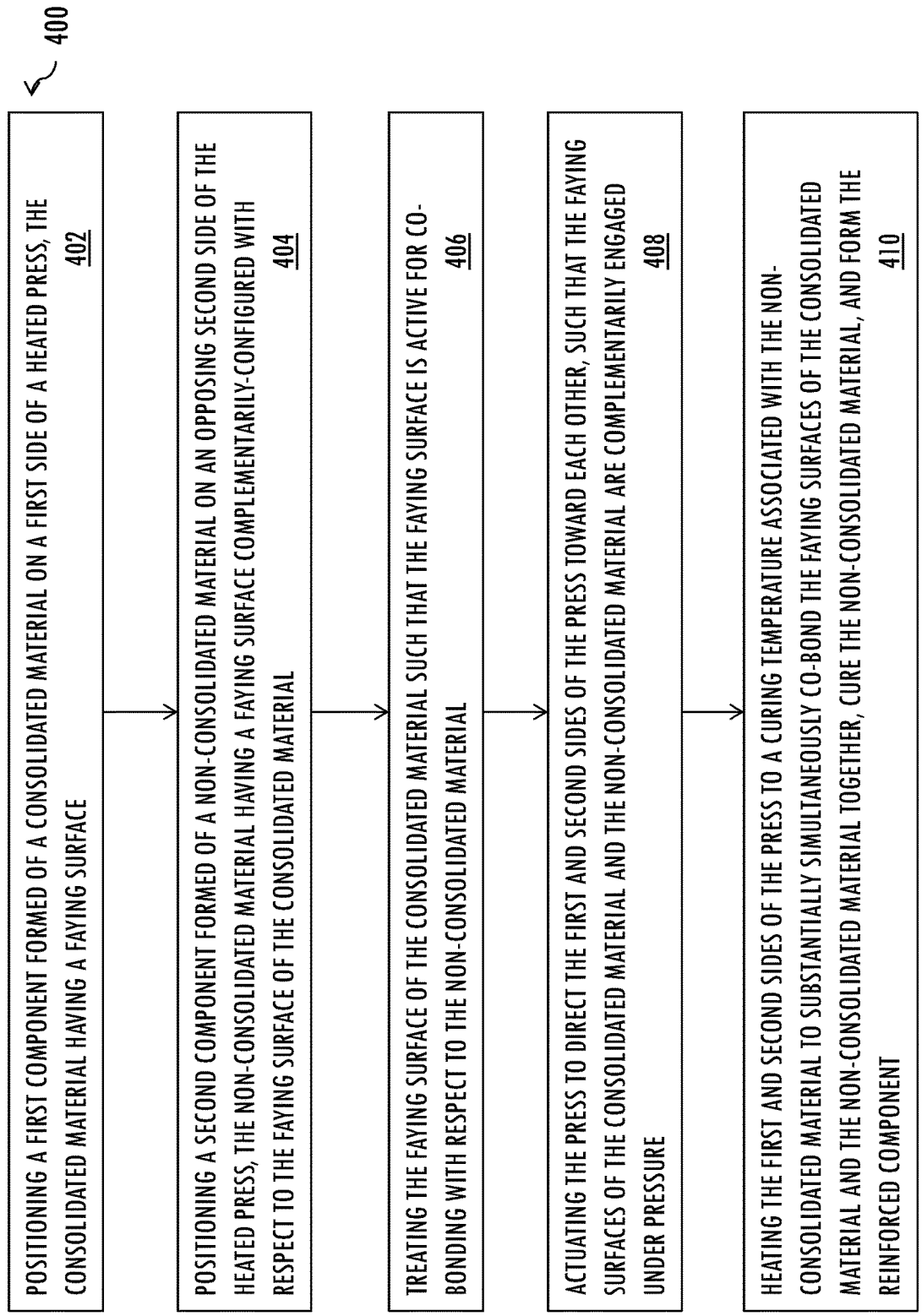
FIG. 4 illustrates a method of forming a reinforced component according to some examples of the present disclosure.

A still further method of forming a reinforced component is provided in FIG. 4, the method generally referred to by the reference numeral 400. The reinforced component is a panel such as that illustrated in FIG. 1. The method 400 is performed using an apparatus, such as the apparatus 200 in FIG. 2.

In a first step, 402, a first component formed of a consolidated material is positioned on a first side of a heated press, the consolidated material having a faying surface. In a second step, 404, a second component formed of a non-consolidated material is positioned on an opposing second side of the heated press, the non-consolidated material having a faying surface complementarily-configured with respect to the faying surface of the consolidated material. In a third step, 406, the faying surface of the consolidated material is treated such that the faying surface is active for co-bonding with respect to the non-consolidated material. In a fourth step, 408, the press is actuated to direct the first and second sides of the press toward each other, such that the faying surfaces of the consolidated material and the non-consolidated material are complementarily engaged under pressure. In a fifth step, the first and second sides of the press is heated to a curing temperature associated with the non-consolidated material to substantially simultaneously co-bond the faying surfaces of the consolidated material and the non-consolidated material together, cure the non-consolidated material, and form the reinforced component.

In some examples, actuating the press to direct the first and second sides of the press toward each other comprises applying a pressure of between about 50 to about 150 pounds per square inch (psi) to the consolidated material and the non-consolidated material between the first and second sides of the press.

In some further examples, heating the first and second sides of the press to the curing temperature comprises heating the first and second sides of the press to between about 250° F. and about 500° F. for between about 25 minutes and about 50 minutes so as to substantially simultaneously co-bond the faying surfaces of the consolidated material and the non-consolidated material together, cure the non-consolidated material, and form the reinforced component.

Many modifications and other examples of the disclosure set forth herein will come to mind to one skilled in the art to which the disclosure pertains having the benefit of the teachings presented in the foregoing description and the associated drawings. Therefore, it is to be understood that the disclosure is not to be limited to the specific examples disclosed and that modifications and other examples are intended to be included within the scope of the appended claims. Moreover, although the foregoing description and the associated drawings describe examples in the context of certain example combinations of elements and/or functions, it should be appreciated that different combinations of elements and/or functions may be provided by alternative examples without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of forming a reinforced panel from a reinforcement component and an uncured panel component, the method comprising:
   providing a heated press with a first portion and an opposing second portion;
   pre-heating, prior to engaging the reinforcement component formed of a non-consolidated material and the uncured panel component formed of a consolidated material with the heated press, the first portion and the second portion of the heated press to a pre-heated temperature, the pre-heated temperature being less than a curing temperature associated with the uncured panel component;

engaging the reinforcement component with the first portion of the heated press, the reinforcement component having a faying surface;

engaging the uncured panel component with the opposing second portion of the heated press, the panel component having a faying surface complementarily-configured with respect to the faying surface of the reinforcement component;

treating the faying surface of the reinforcement component such that the faying surface of the reinforcement component is active for co-bonding with respect to the panel component;

actuating the heated press to direct the first portion and the second portion of the heated press toward each other, such that the faying surface of the reinforcement component and the faying surface of the panel component are complementarily engaged under pressure; and heating the first portion and the second portion of the heated press to the curing temperature from the pre-heated temperature associated with the panel component, to substantially simultaneously co-bond the faying surface of the reinforcement component and the faying surface of the panel component together, cure the panel component while the reinforcement component is non-consolidated, and form the reinforced panel.

2. The method of claim 1, wherein the reinforcement component comprises a thermoplastic or thermoset stiffener and the panel component comprises a thermoset skin, and wherein heating the first portion and the second portion of the heated press to the curing temperature comprises heating the first portion and the second portion of the heated press to a curing temperature associated with the thermoset skin to substantially simultaneously co-bond the faying surfaces of the thermoplastic or thermoset stiffener and the thermoset skin together, cure the thermoset skin, and form the reinforced panel.

3. The method of claim 1, wherein actuating the heated press to direct the first portion and the second portion of the heated press toward each other comprises applying a pressure of between about 50 to about 150 pounds per square inch (psi) to the reinforcement component and the panel component between the first portion and the second portion of the heated press.

4. The method of claim 1, wherein heating the first portion and the second portion of the heated press to the curing temperature comprises heating the first portion and the second portion of the heated press to between about 250° F and about 500° F for between about 25 minutes and about 50 minutes so as to substantially simultaneously co-bond the faying surface of the reinforcement component and the faying surface of the panel component together, cure the panel component, and form the reinforced panel.

5. The method of claim 1, wherein the reinforcement component is a thermoplastic stiffener, and wherein treating the faying surface of the thermoplastic stiffener comprises applying a thermoplastic film on the faying surface of the thermoplastic stiffener such that the faying surface is active for co-bonding with respect to the panel component.

6. The method of claim 5, wherein applying the thermoplastic film on the faying surface of the thermoplastic stiffener comprises applying a film of a polyetherimide (PEI), a polyphenylene sulfide, a polyimide, a polyamide, a polyamide-imide, a polyester, a polybutadiene, a polyurethane, a polypropylene, a polysulfone, a polyethersulfone, a polyphenylsulfone, a polyacrylamide, a polyketone, a polyphthalamide, a polyphenylene ether, a polybutylene a terephthalate, a polyethylene, a polyethylene terephthalate, a polyester-polyarylate, a polytetrafluoroethylene (PTPE), or any combination, on the faying surface of the thermoplastic stiffener.

7. The method of claim 1, wherein the reinforcement component is a thermoset stiffener, and wherein treating the faying surface of the reinforcement component comprises one or both of applying an adhesive promoter film on the faying surface of the thermoset stiffener and performing an energetic surface preparation on the faying surface of the thermoset stiffener such that the faying surface is active for co-bonding with respect to the panel component.

8. The method of claim 7, wherein performing the energetic surface preparation on the faying surface of the thermoset stiffener comprises performing a corona treatment, a plasma treatment, or a flame treatment on the faying surface of the thermoset stiffener such that the faying surface is active for co-bonding with respect to the panel component.

9. The method of claim 1, further comprising applying suction to the heated press to remove any air or volatiles trapped in the uncured panel component.

10. The method of claim 1, wherein engaging the reinforcement component with the first portion of the heated press comprises engaging a press surface of the reinforcement component with a press member complementarily configured with respect to the press surface, the press surface opposing the faying surface of the reinforcement component.

11. The method of claim 1, wherein engaging the reinforcement component with the first portion of the heated press comprises engaging the reinforcement component having a cross-section that is shaped as a "bell", a "hat", an "I", a "J", or a "T" with the first portion of the heated press.

12. The method of claim 1, further comprising molding or stamping a material to form the reinforcement component before engaging the formed reinforcement component with the first portion of the heated press.

13. The method of claim 1, further comprising collating uncured plies of the panel component before engaging at least one of the plies with the second portion of the heated press.

14. The method of claim 1, wherein heating the first portion and the second portion of the heated press comprise heating the first portion and the second portion of the heated press to the curing temperature associated with the panel component, the curing temperature being less than a curing temperature associated with the reinforcement component, to substantially simultaneously co-bond the faying surface of the reinforcement component and the faying surface of the panel component together, cure the panel component, and form the reinforced panel.

15. The method of claim 1, wherein actuating the heated press to direct the first portion and the second portion of the heated press toward each other, such that the faying surface of the reinforcement component and the faying surface of the panel component are complementarily engaged under pressure occurs before heating the first portion and the second portion of the heated press to the curing temperature from the pre-heated temperature associated with the panel component, to substantially simultaneously co-bond the faying surface of the reinforcement component and the faying surface of the panel component together, cure the panel component, and form the reinforced panel.

16. A method of forming a reinforced component, the method comprising:
   positioning a first component formed of a consolidated material on a first side of a heated press, the consolidated material having a faying surface;
   positioning a second component formed of a non-consolidated material on an opposing second side of the heated press, the non-consolidated material having a faying surface complementarily-configured with respect to the faying surface of the consolidated material;
   treating the faying surface of the consolidated material such that the faying surface is active for co-bonding with respect to the non-consolidated material;
   actuating the heated press to direct the first side and the second side of the heated press toward each other, such that the faying surface of the consolidated material and the faying surface of non-consolidated material are complementarily engaged under pressure; and
   heating the first side and the second side of the heated press to a curing temperature associated with the non-consolidated material to substantially simultaneously co-bond the faying surface of the consolidated material and the faying surface of the non-consolidated material together, cure the non-consolidated material, and form the reinforced component.

17. The method of claim 16, wherein actuating the heated press to direct the first side and the second side of the heated press toward each other comprises applying a pressure of between about 50 to about 150 pounds per square inch (psi) to the consolidated material and the non-consolidated material between the first side and the second side of the heated press.

18. The method of claim 16, wherein heating the first and second sides of the heated press to the curing temperature comprises heating the first side and the second side of the heated press to between about 250° F and about 500° F for between about 25 minutes and about 50 minutes so as to substantially simultaneously co-bond the faying surface of the consolidated material and the faying surface of the non-consolidated material together, cure the non-consolidated material, and form the reinforced component.

* * * * *